United States Patent [19]
Pearce

[11] 3,831,089
[45] Aug. 20, 1974

[54] CONTINUITY TESTER
[76] Inventor: George Pearce, 5 Elm St., Wenham, Mass. 01923
[22] Filed: Oct. 10, 1973
[21] Appl. No.: 404,851

Related U.S. Application Data
[63] Continuation of Ser. No. 173,536, Aug. 20, 1971, abandoned.

[52] U.S. Cl. ............... 324/122, 324/51, 324/133, 340/252 R
[51] Int. Cl. ............... G01r 31/02, G01r 19/14
[58] Field of Search ............... 324/122, 133, 51; 340/252 R, 255, 256

[56] References Cited
UNITED STATES PATENTS
3,277,364 10/1966 Abrahamson ............... 324/133
3,524,133 8/1970 Arndt ............... 324/122

Primary Examiner—Alfred E. Smith
Assistant Examiner—Ernest F. Karlsen
Attorney, Agent, or Firm—Charles Hieken; Jerry Cohen

[57] ABSTRACT

A multi-test, handheld instrument for testing the continuity of an electrical circuit utilizes an indicator lamp which lights when continuity is present. The instrument also serves as a voltmeter by causing a neon lamp to flash at a rate dependent upon the impressed voltage. The instrument contains a battery as its power source and is arranged to prevent discharge of the battery when the test leads are inadvertently or deliberately shorted together.

5 Claims, 5 Drawing Figures

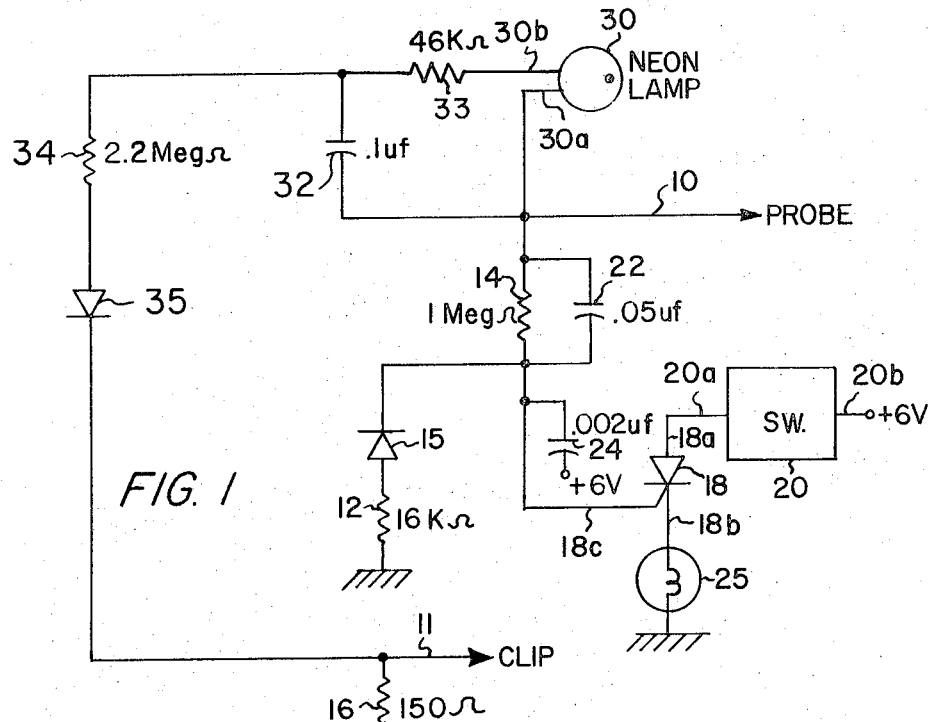
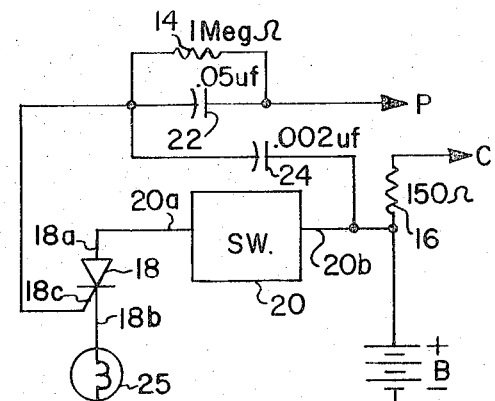
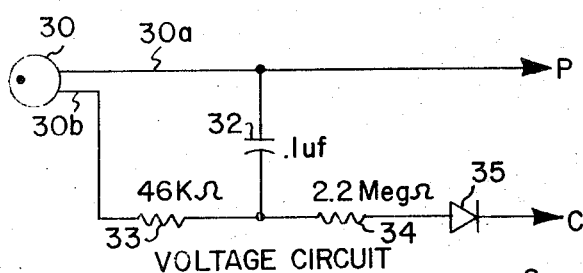
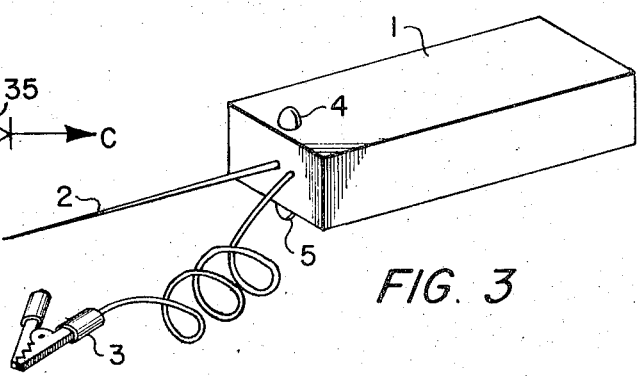

CONTINUITY TESTER

This is a continuation of application Ser. No. 173,536, filed Aug. 20, 1971, now abandoned.

FIELD OF THE INVENTION

This invention relates in general to multi-test instruments of the type used to ascertain the presence of voltage or determine whether a complete electrical circuit exists. More particularly, this invention is concerned with a simple, rugged multi-tester which can stand up to the rough usage commonly accorded to portable test instruments by maintenance and service personnel. Rather than employ delicate meter movements, the invention employs indicator lamps which are better able to withstand rough handling.

BACKGROUND OF THE INVENTION

Continuity testers are known which utilize meters, buzzers, or lamps to indicate the presence of a complete circuit. The conventional continuity tester commonly employs a battery which can be completely discharged where the robes are shorted together for an extensive period. The accidental discharge of the battery is a not uncommon occurrence where the continuity tester is carried about in a tool box and the leads are inadvertently shorted. In the maintenance and servicing of electrical apparatus, it is often more important to ascertain whether electrical power is present rather than obtain an exact measure of the voltage. The magnitude of the voltage is, in many instances of secondary importance and a rough estimate of the voltage is often sufficient. Further, in some instances, unexpectedly high voltages have been encountered which have damaged the conventional voltmeter because it was not set to the appropriate range. There is therefore a requirement for a self-contained, portable instrument for continuity testing which is rugged and reliable and includes a simple voltage indicator.

OBJECTS OF THE INVENTION

The principal objective of the invention is to provide a rugged and reliable, self-contained, handheld instrument for testing circuit continuity. Another objective of the invention is to combine the circuit continuity tester with a rugged voltage indicator. A further objective of the invention is to provide the test instrument with a simple battery recharger.

THE INVENTION

The invention resides in a compact, self-contained, handheld, electrical instrument that does not contain delicate meter movements or other components that can easily be damaged by rough usage. The instrument utilizes a continuity tester having its power furnished from a battery in the instrument housing. In the continuity test, a controlled recrifier in the instrument is triggered into conduction when circuit continuity is established and the current flowing through the rectifier lights a lamp. The lamp remains lit until the rectifier is returned to its non-conductive state by actuating a switch. A capacitor in the input circuit of the controlled rectifier must discharge before the rectifier can again be again triggered into conduction. To enable the capacitor to discharge, circuit continuity must be broken. The instrument leads can therefore remain shorted without discharging the battery where the rectifier is once returned to its non-conductive state. The instrument also serves as an a.c. voltmeter by causing a neon lamp to flash at a rate related to the a.c. voltage impressed upon the instrument leads. The rate of flash is controlled by a rectifier circuit having a timing capacitor which charges to the ignition voltage of the neon lamp. The instrument may also include an arrangement for recharging the battery.

THE DRAWINGS

The invention, both as to its construction and mode of operation, can be better understood from th following exposition when considered in conjunction with the accompanying drawings in which FIG. 1 schematically depicts the electrical arrangement of the preferred embodiment of the invention;

FIG. 2A is a schematic diagram of a battery charger circuit employed in the preferred embodiment;

FIG. 2B is a schematic diagram of the continuity tester employed in the invention;

FIG. 2C is a circuit diagram of the voltage indicator employed in the invention; and FIG. 3 shows the preferred external form of the invention.

THE EXPOSITION

Referring now to the drawings, FIG. 1 schematically shows the preferred electrical arrangement of the invention. The test instrument of FIG. 1 has a continuity test circuit, a voltage indicator circuit, and a battery charging circuit arranged to obtain their inputs from the same pair of leads 10 and 11. For ease of exposition the battery charging circuit, continuity test circuit, and voltage indicator circuit are shown separately in FIGS. 2A, 2B, and 2C, respectively. The terminals marked +6V in FIG. 1 correspond to the positive terminal of battery B in FIGS. 2A and 2B whereas the chassis ground symbol in FIG. 1 corresponds to the negative terminal of that battery. The instrument of FIG. 1 has a switch 20 which determines whether the test is to be for continuity or for voltage. In the preferred embodiment, the switch is of the type which is sensitive to gravity. Such switches are opened and closed simply by holding the switch in a different attitude. An example of a switch of that type is the mercury switch which changes from one state to another merely by tilting the switch or turning it over.

For ease of exposition, the lead 10 is assumed to be terminated in a probe and the lead 11 is assumed to be terminated in a clip. Th terminals of those leads have, accordingly, been designated P for "probe" and C for "clip" in the drawings. In the preferred embodiment of the invention depicted in FIG. 3, the electrical circuitry is within a rectangular housing 1. The probe 2 is a slender metal rod which extends from the housing. Where desired the metal rod can be sheathed in an insulative sleeve so that only the tip of the probe is exposed. Thus accidental damage to the instrument or to the apparatus under test is prevented by the sleeve since electrical connection to the probe can only be made through its exposed tip. Extending through the housing 1 is the lead 11 carrying a clip 3 which may, for example, be a conventional alligator clip. The lead 11 is preferably an insulated wire of sufficient length as to not unduly restrict movement of the housing. Th housing is of a size such that the housing is easily grasped and held by one one hand. Within the housing is a lamp 25 whose light can be seen through a window 4. On the opposite side of the housing is another window 5 through which light emanating from a neon glow lamp 30 can be seen. Of course, where the housing is made of a transparent or translucent material, the windows become unnecessary as the lamps, though within the housing, are visible when they are lit.

The instrument is powered by one or more batteries contained in the housing 1. Where the batteries are of the rechargeable type, they are recharged by charging circuit schematically depicted in FIG. 2A. In that circuit the battery B is connected to the C lead through a resistor 16 and is connected to the P lead through the serially arranged resistors 12, 14 and the rectifier diode 15. Assuming an a.c. voltage is impressed on the P an C leads from an external source such as the usual 110 or 220 volt mains, current can flow only in the direction permitted by rectifier 15 and therefore the current is in the proper direction to recharge the battery B of FIG. 2A. Resistor 14 limits the current to a value which is not excessive for the battery at the highest voltage anticipated. In the event an unexpectedly high voltage is impressed on the charge circuit, resistor 16 is of sufficiently low wattage rating that it burns out before the battery is damaged by excessive current flow. Where the P and C leads are intentionally or inadvertently shorted together, the battery B is prevented by the diode 15 from discharging through the charging circuit. The battery B can also be charged by an applied d.c. voltage, provided the impressed voltage is of the proper polarity to forwardly bias the diode 15. If the d.c. voltage is of improper polarity, the P and C leads can be reversed to make the polarity correct for charging.

FIG. 2B illustrates the schematic arrangement of the continuity circuit employed in the preferred embodiment. The P lead is coupled to the gate 18c of a silicon controlled rectifier (SCR) 18 through a capacitor 22 which is shunted by the resistor 14. The anode 18a of the SCR is coupled through switch 20 to the positive terminal of battery B. The cathode 18b of the SCR is connected to the negative terminal of the battery through lamp 25. The C lead is connected by the resistor 16 to the positive terminal of battery B.

The continuity circuit is disabled when switch 20 is open and is operative when switch 20 is closed. Where the switch is of the gravity operated type, the housing must be held in the position which causes switch 20 to be closed if a test for continuity is to be made. Assuming switch 20 is closed, the potential applied by the battery B between the anode 18a and cathode 18b places the SCR in condition to fire when a positive signal is applied to the gate 18c. Where continuity exists in the apparatus under test, the P and C leads are coupled through the continuous path. Consequently a positive wavefront passes through capacitor 22 to the gate 18c of the SCR when continuity between the P and C leads is initially established. The positive wave causes the SCR to become conductive, whereupon the lamp 25 lights. Once the SCR is triggered into conduction, the gate becomes ineffective to control the SCR and the SCR remains in its conductive state until the positive potential on its anode is removed by opening switch 20. The switch 20 is readily opened in the preferred embodiment by moving the housing to a position where gravity causes the switch to open. After the initial positive wavefront passes through capacitor 22, capacitor 22 continues to change if the P and C leads are still electrically coupled but the charging rate is insufficient to trigger the SCR into conduction where the SCR is extinguished by momentarily interrupting the potential on its anode. Inadvertent retriggering of the SCR by noise is prevented by the capacitor 24 which prevents noise spikes from reaching the gate 18c. To retrigger the SCR, the P and C leads must be uncoupled sufficiently to permit capacitor 22 to discharge through resistor 14. Thereafter, the SCR can again be retriggered into conduction.

Because of the foregoing operation of the instrument, when the instrument is to be transported, the clip can be fastened to the bare probe. If the switch 20 is closed, the lamp 25 lights when the clip touches the bare probe. By momentarily opening switch 20 to cause the SCR to be extinguished, the SCR cannot be again triggered into conduction until the clip is separated from the probe. Thus, so long as the clip is clamped onto the probe the instrument can be safely transported without danger of discharging the battery.

The instrument, as shown in FIGS. 1 and 2C, employs a neon glow lamp 30 as a voltage indicator. Neon glow lamps are well known in the electronics art and such can be obtained with different threshold voltages at which the lamps ignite. A typical neon glow lamp may, for example, have an ignition voltage of 80 or 90 volts and an extinguishing voltage of about 55 volts. In the FIG. 2C circuit, the probe P is connected directly to one electrode 30a of the neon glow lamp. The P lead is connected to the C lead by a timing circuit formed by a capacitor 32 in series with a resistor 34 and a diode 35. When the neon lamp is conductive, cpaacitor 32 can discharge through the path offered by that lamp and ballast resistor 33. When an a.c. voltage is impressed upon the P and C leads, a half-wave rectified current flows in the timing circuit, causing a charge to build up in capacitor 32. When the charge in the capacitor reaches the threshold voltage of the neon lamp, that lamp ignites and the capacitor thereupon discharges through the lamp. To slow down the discharge through the neon lamp, ballast resistor 46 is placed in the discharge path. When the charge in the capacitor drops to the extinguishing voltage, the neon glow lamp is extinguished and a new capacitor charging cycle commences. The neon lamp again lights when the charge in capacitor 32 reaches the ignition threshold voltage. Thus the neon glow lamp flashes at a rate determined by the charging and discharging of capacitor 32. Inasmuch as the rate at which capacitor 32 charges is dependent upon the impressed voltage, the rate at which the lamp flashes is a measure of that voltage. For example, the component values given in FIG. 2C are intended to cause the neon glow lamp to flash at a rate of about two flashes per second when an 110 volt, 60 cycle, a.c. voltate is applied to the leads P and C. When the 60 cycle a.c. voltage is increased to 220 volts, the rate of flashing increases noticeably. Thus, the flash rate gives a visual indication of the approximate voltage applied to the leads.

The voltage indicator in the instrument can also be used to sense the polarity of d.c. voltages whose amplitude exceeds the ignition voltage of the neon glow lamp. This attribute of the instrument ensues because the P lead must be positive with respect to the C lead to forwardly bias the diode 35. Where the diode is reversely biased, the leakage current is inadequate to fire the neon glow lamp. Where the d.c. voltage is of sufficient amplitude and the polarity applied to the leads is in the direction which forwardly biases diode 35, the neon lamp lights when the charge across capacitor 32 reaches the ignition voltage. The capacitor discharges through the neon lamp and when the voltage drops to the extinguishing level, the lamp goes out. The lamp does not relight until the charge across capacitor 32 again reaches the ignition voltage. Thus the neon lamp flashes at a rate that is a measure of the d.c. voltage applied to the leads. The flash rate for d.c. voltage is higher than the flash rate for a a.c. voltage of comparable amplitude becuase of the half-wave rectification of the a.c. current caused by the diode 35. Where the impressed d.c. voltage is sufficiently high, the neon glow lamp will cease to flash and will remain lit.

Because of the interconnection of the circuits in the instrument, while the battery is being recharged from the a.c. mains, the neon glow lamp continues to flash at a rate related to the impressed a.c. voltage.

In using the instrument, it is customary to first test for the absence of voltage before making a test for continuity. However, should a continuity test be made when voltage is present in the circuit being tested, the continuity tester will not be damaged because (1) only the voltage of battery B is across the anode and cathode of the SCR, (2) diode 17 prevents a large reverse voltage from appearing between the gate and the cathode of the SCR, (3) neon lamp 30 limits the positive voltage that can appear on lead 10, and (4) resistor 14 limits the current flow in the gate 18c to a value that can be tolerated by the SCR.

In the preferred embodiment, gravity switch 20 is arranged so that it is open when a test for voltage is made. Preferably, the housing must be then turned over to cause the switch to close and place the instrument in condition to check for circuit continuity. Thus, in FIG. 3, the neon glow lamp is located on the side of the housing opposite from lamp 25. The gravity switch 20 can be replaced by a slide or toggle switch which is spring biased to be normally open. With such a switch, both lamps would therefore have to be manually closed in order to make a test for continuity. Ordinarily, such a test would only be made if the neon lamp did not light as the failure of that lamp to light indicates the absence of a voltage that is sufficiently high to damage the continuity tester.

Although only the preferred embodiment of the invention has been illustrated, it is apparent that the invention can take different forms. It is intended therefore that the invention not be restricted to the precise arrangement and circuits here illustrated, but rather that the invention be delimited by the appended claims and include only those devices that do not fairly depart from the essence of the invention.

I claim:

1. Apparatus for indicating the presence of line voltage and continuity comprising, first and second conducting leads for connection to an external circuit that may provide line voltage between said leads, impedance means permanently connected between said first and second leads for limiting the current through said first and second leads to a nondamaging value when line voltage is applied therebetween, first indicating means electrically coupled to said impedance means for indicating the presence of line voltage when said first and second conducting leads are connected to a source thereof, said impedance means including capacitive means for receiving a charge through means including said first and second leads when said leads are connected to a low impedance of magnitude much less than that of said impedance means, second indicating means for indicating continuity when the charge carried by said capacitive means changes, means including a battery and said first and second leads when said leads are connected to a low impedance of magnitude much less than that of said impedance means for selectively coupling charge to said capacitive means, and switching and electrically coupled to said capacitive means and said second indicating means for causing said second indicating means to indicate continuity in response to a predetermined change in the charge carried by said capacitive means.

2. Apparatus for indicating the presence of line voltage and continuity in accordance with claim 1 wherein said switching means comprising a controlled rectifier connected in series between said second indicating means and said battery means and having its gate electrode coupled to said capacitive means for rendering said controlled rectifier conductive in response to a change in the charge carried by said capacitive means.

3. Apparatus for indicating the presence of line voltage and continuity in accordance with claim 2 and further comprising a switch in series with said controlled rectifier and said battery means.

4. Apparatus for indicating the presence of line voltage and continuity in accordance with claim 3 and further comprising a resistor shunting said capacitive means to provide a discharge path for said capacitive means.

5. Apparatus for indicating the presence of line voltage and continuity in accordance with claim 4 and further comprising means for recharging said battery means by connecting said first and second conducting leads to a suitable electric potential source, the recharging means including a rectifier in series with a current limiting resistor, the recharging means being in series with the battery means across said first and second conducting leads, and the rectifier being poled to permit current to flow in the direction to charge the battery and to block current flow in the reverse direction.

* * * * *